United States Patent [19]

Broussoux et al.

[11] Patent Number: 5,235,463
[45] Date of Patent: Aug. 10, 1993

[54] METHOD FOR THE MAKING OF MICROLENSES FOR OPTICAL APPLICATIONS

[75] Inventors: Dominique Broussoux, Marcoussis; Jean-Marc Bureau, Palaiseau; Daniel Dolfi, Orsay; Sylvain Lazare, Léognan, all of France

[73] Assignee: Thomson-CSF, Puteaux, France

[21] Appl. No.: 800,423

[22] Filed: Dec. 2, 1991

[30] Foreign Application Priority Data

Dec. 4, 1990 [FR] France ............................... 90 15159

[51] Int. Cl.⁵ .................................................. G02B 3/00
[52] U.S. Cl. .................................. 359/642; 359/455; 359/900; 372/109; 385/33
[58] Field of Search ............... 359/455, 642, 900, 654; 372/109; 385/33

[56] References Cited

U.S. PATENT DOCUMENTS

| | | | |
|---|---|---|---|
| 4,678,268 | 7/1987 | Russo et al. | 359/642 |
| 4,948,214 | 8/1990 | Hamblen | 359/654 |
| 4,952,037 | 8/1990 | Oikawa et al. | 359/654 |
| 5,018,164 | 5/1991 | Brewer et al. | 372/109 |

FOREIGN PATENT DOCUMENTS 57-204184 12/1982 Japan.
2-158632 6/1990 Japan.
2199156 6/1988 United Kingdom.

*Primary Examiner*—Loha Ben
*Attorney, Agent, or Firm*—Roland Plottel

[57] ABSTRACT

Disclosed is a method for the making of microlenses for optical applications (display for example) resulting from the deposition of a liquid on a substrate, the surface of which has been locally modified so as to increase the wetting capacity of the liquid thereon. The substrate may be a polymer and the wetting liquid may be an organic fluid capable of hardening by an adapted treatment.

15 Claims, 2 Drawing Sheets

METHOD FOR THE MAKING OF MICROLENSES FOR OPTICAL APPLICATIONS

BACKGROUND OF THE INVENTION

1. Field of the Invention

The present invention relates to a new method for making microlenses that can be used in optical applications.

More precisely, it relates to microlenses made on a flexible or rigid, organic, metallic or semiconductor substrate.

A lens is generally an optical device capable of modifying the convergence of a light beam by means of a curvature of one of its faces. It is formed by a portion of a sphere and is defined by its focal length, which is dependent on the refraction index of the material and on the radius of curvature of the sphere.

Associated in groups, microlenses can be used for example in displays to increase the inter-pixel space so as to facilitate the implanting of the control tracks for the pixels or they can be used in optical reading devices or X-ray imaging devices. In the latter two types of applications, the matrix of microlenses is used to make photon beams converge on photoconductive elements that are capable of transmitting information elements.

2. Description of the Prior Art

There are several techniques for the manufacture of microlenses at the present time:

The firm Corning uses a technique that enables the batch manufacturing of the lenses by subjecting a photosensitive glass to a UV radiation through a mask. The glass then undergoes a heat treatment at a temperature of 500° C. to 600° C., leading to a crystallization of the zones subjected to ultra-violet rays and, hence, locally to a densification of the material. This densification causes a contraction of the dimensions that forces the non-illuminated zones to emerge in spherical form. The drawback of this technology is the nature of the substrate which dictates the use of a special photosensitive glass that is rigid and cannot be used to cause variation notably in the focal length of the microlens thus formed.

Nippon Sheet Glass Co. has developed microlenses by using the technique of ion exchange which consists in exchanging an ion of the substrate with an ion of a melted salt previously deposited through a metal mask. The substrate is identical to the one used by Corning. It is a silica containing different oxides capable of migrating at temperatures of over 500° C. At these temperatures, the ions of the melted salt diffuse from outside inwards while the ions of the substrate diffuse from inside outwards, and this leads to an index gradient. The drawbacks of this technique lie in the duration of the method, which lasts about 100 hours and is conducted under very high temperatures (500° C.).

Xerox has developed another technique in which there is deposited, on a quartz substrate, an aluminum structure wherein only disks with a diameter d are left transparent. Centered on these transparent zones, there is deposited a positive resin pattern with a diameter D, such that D is greater than d. After the inversion of the resin by deep UV treatment, a cylinder pattern is obtained with a diameter D' between d and D. Several types of thermal and UV treatment (*Applied Optics*, vol. 27, No. 7, 1988) enable the cylinders to be converted into spheres. The advantage of this technique lies in the use of the standard methods of microelectronics, but the major drawbacks remain the number of steps and masks that have to be used for this method as well as the problem of achieving control over the dimensions of the patterns and over the resistance of the lower layers to the chemical solvents used.

In general, these techniques cannot be used to make microlenses on varied substrates such as semiconductors, polymers, metals or crystals, but only on rigid substrates that are limited in nature. Furthermore, most of them have complex protocols with numerous steps.

SUMMARY OF THE INVENTION

In this context, the present invention proposes a new method for the manufacture of microlenses that can be notably prepared on an organic flexible substrate capable of being deposited on or attached subsequently to any other support, the method having only very few manufacturing steps. The microlenses according to the invention can be obtained from a fluid material, the wetting capacity of which, on an adapted substrate, is increased locally by a specific treatment of the substrate.

As a rule, when a liquid is placed in contact with a solid, a drop is formed at equilibrium. The envelope of this drop forms an angle A with the surface on which it is deposited. This angle A is related by Young's equation to the free energies of the surface $W_S$ of the solid and $W_L$ of the liquid as well as to the interfacial free energy $W_{SL}$ of the liquid by the relationship: $W_{SL} = W_S - W_L \cos A$. This angle, which can be evaluated optically, gives an empirical criterion of the capacity of a liquid to wet a solid substrate. Thus, when A is close to 0, the liquid wets the solid substrate very well. It is also shown that cos A tends towards 1 for values of $W_L$ below a critical value $W_C$ dependent on the substrate, and that cos A diminishes linearly with $W_L$ for values greater than $W_C$, the value $W_C$ being all the greater as $W_S$ is high.

Thus, glass and metals, which have high surface energies, are wet by most of liquids while the polymer materials, which have low surface energy, are wet only by liquids having a surface tension below the threshold value $W_C$. In practice, it is seen that the angle A may assume a value between that of $A_A$, known as an "advancing" angle, and that of $A_r$, known as a "retreating" angle, these angles being defined with respect to the direction of progress of the fluid (FIG. 1), and that it depends especially on the technique used to form the drop. By using a deposition by pipette, the angle A defined with the substrate formed by the drop obtained tends towards the angle $A_a$ while a drop formed by coalescence from a film generates an angle A close to $A_r$. The hysteresis that exists between $A_a$ and $A_r$ depends on the nature of the solid substrate. Thus the polymers, which have smooth surfaces, display low hysteresis and do not retain the liquids with high surface tension which tend to slip above. It is possible, however, to increase the difference $A_a - A_r$ so as to increase the wetting capacity of liquids on a polymer type substrate. For, an increase in $A_a$ accompanied by a decrease in $A_r$ raises the capacity of a substrate to be wet by a given category of liquid. Studies conducted on the pair [water, Kapton polymer film (commercially marketed polyimide)] have shown that, in the presence of a very high UV irradiation generated by a laser emitting in the ultraviolet range between 100 and 400 nm, this laser being possibly excimer type laser, it is effectively possible to influence the parameter $A_a - A_r$ (FIG. 2). The fluence illustrates the density of energy given by the laser and the hatched zone corresponds to the appearance of the ablation threshold of Kapton, a value beyond which matter is expelled from the polymer.

The present invention uses this physical phenomenon to obtain drops at determined places on a substrate which is naturally not wet or which undergoes little wetting by liquids.

As a substrate, it is possible to use a polymer capable of locally modifying its surface state by an adapted treatment and to deposit thereon a liquid which will coalesce at the places treated. This liquid should be capable of setting in lump so as to provide for obtaining microlenses from the drops formed on the substrate. As a rule, it will be easier to find, among the organic materials, materials having little wetting capacity wherein this wetting capacity can be increased locally. In the same way, the liquid deposited will generally be an organic substance.

An object of the invention, therefore, is a new method for the manufacture of microlenses made in batches, resulting from the deposition of a liquid on a substrate, the surface of which has been locally modified in order to increase the wetting capacity of the liquid thereon, wherein this treatment may be of the UV irradiation type. The substrate, which may be of an organic nature, is preferably a polymer that is very little wettable by organic compounds. It may be constituted, for example, by highly stable aromatic polymers forming very few "hydrogen" type bonds with a drop of organic material. These aromatic polymers may be, for example, of the polyimide type such as Kapton (commercially available polyimide) or of the polyphenylquinoxaline type. The material forming the microlens is preferably a fluid organic material capable of being hardened through an adapted treatment. It may be, for example, thermosetting resin or resin that can be hardened by ultraviolet radiation of the epoxy resin or silicone resin type, or again a monomer polymerizable in lump such as styrene. To create preferred zones of wettability, the substrate should preferably undergo a treatment capable of modifying its surface state. A treatment such as this may be, for example, of the intense ultraviolet radiation type, capable of inducing photochemical reactions to promote the bonds between the wetting organic material and the substrate.

BRIEF DESCRIPTION OF THE DRAWINGS

The invention will be understood more clearly, and other advantages will appear from the following description, given as a non-restrictive example and from the appended drawings, of which.

MORE DETAILED DESCRIPTION

In one exemplary embodiment, to obtain a matrix of microlenses, a flexible polymer film is used. Using a mask projection device or a mask made by standard techniques used in microlithography, the polymer substrate is irradiated with a high energy density source of an excimer laser of the argon-fluorine type emitting at 193 nm or of the krypton-fluorine type emitting at 248 nm or, again, of the xenon-chlorine type emitting at 308 nm. Preferably, this irradiation is done in air or under an atmosphere with controlled humidity. The nature of the laser is adapted to that of the polymer substrate for which it is sought to modify the surface chemical structure, the nature of the polymer being chosen so as to make the substrate transparent to the wavelengths of use.

Figure 1:
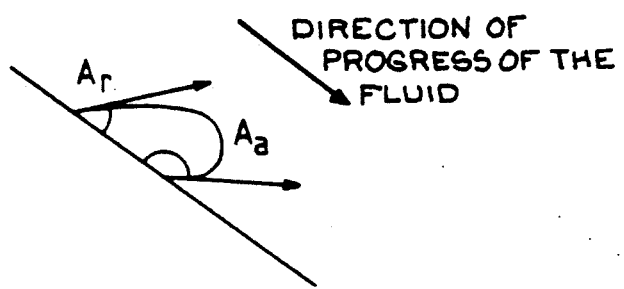
FIG. 1 shows the angle $A_a$ called an advancing angle and the angle $A_r$ called a retreating angle with respect to the direction of progress of a fluid on a given substrate.
Figure 2:
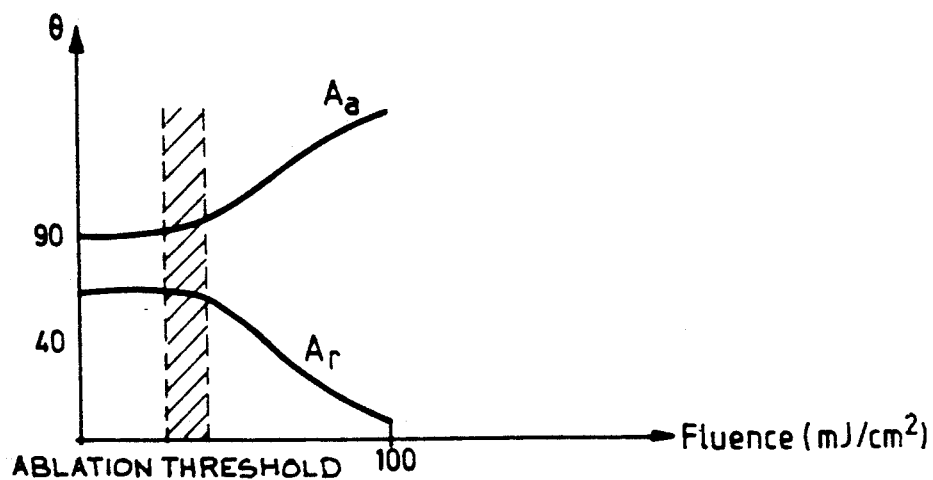
FIG. 2 shows the influence of a high energy density ultraviolet treatment previously undergone by the substrate, on the angles $A_a$ and $A_r$ formed during the deposition of a drop on a Kapton type substrate.
Figure 3:
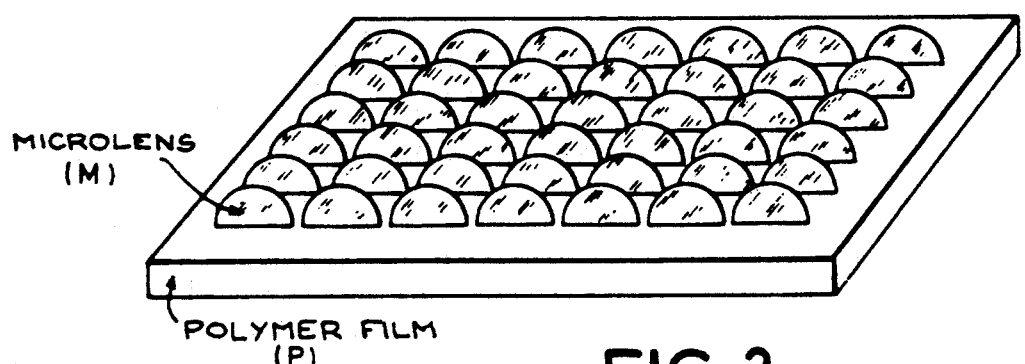
FIG. 3 shows an exemplary embodiment of a matrix of microlenses, obtained with a flexible substrate of Kapton polymer and drops formed out of a mixture (Epotecny resin, hardener)
Figure 4:
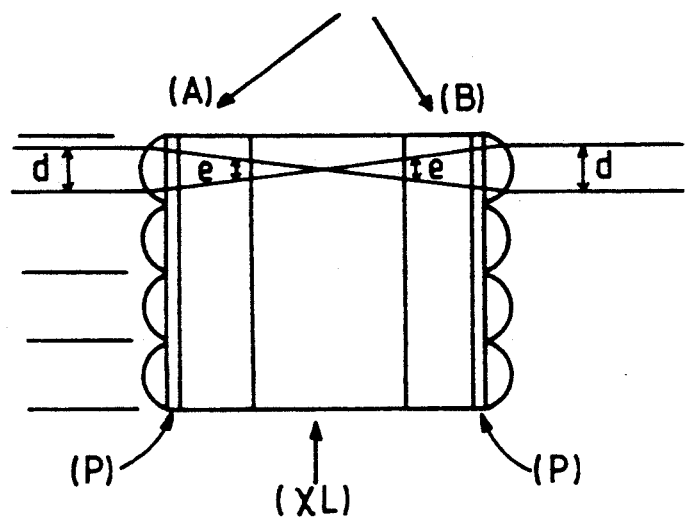
FIG. 4 illustrates a spatial modulator of light using two sets, of matrices of microlenses according to the invention.

On the locally irradiated and modified substrate, a film of fluid organic material is deposited, either by pipette or by the condensation of a vapor. After deposition, the fluid gradually gets concentrated on the irradiated zones. At equilibrium, drops of fluid distributed in the unmasked zones are obtained. It is then appropriate to make the organic fluid harden so as to obtain solid drops on the substrate, forming the matrix of microlenses (FIG. 3). To this end, the matrix is subjected to a heat treatment or photochemical treatment enabling the induction of cross-linkages in order to rigidify the organic drops.

The control of the deposited quantity of organic material makes it possible to influence the thickness and hence the focal length of the microlenses. The matrix of microlenses made on a flexible film may be subsequently attached to any other organic, metallic or semiconductor support. It is also possible to carry out a deposition, by centrifugation, of a polymer film on any other support and then operate according to the above-described method. The substrate of the polymer may also be rigid.

The matrices of microlenses according to the invention may be used in spatial modulators of light. On a liquid crystal matrix constituted by a liquid crystal (XL) inserted between two locally conductive plates of glass (A and B), there is attached, on either side, a film of polymer (P) on which microlenses have been made according to the method of the invention. A device such as this enables the addressing of the small-sized pixels e by wider control tracks (dimension d).

Figure 5:
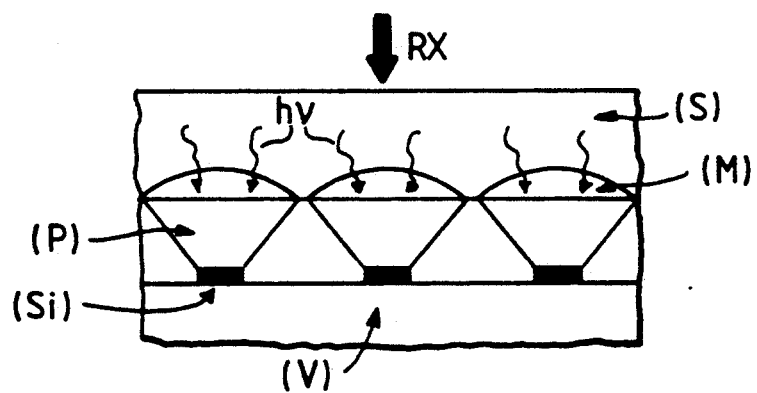
FIG. 5 shows an X-ray imaging device using a network of microlenses according to the invention.

The matrices of microlenses according to the invention may be seen to be very promising in imaging devices of the X-ray imaging type. To this end, an X-radiation conveying information elements irradiates a scintillator material (S) of the caesium iodide type or of another type, capable of converting X-rays into visible photons. These photons then irradiate the matrix of microlenses (M) deposited on a polymer support (P) which is itself deposited on the glass (V) locally including a network of photosensitive elements (Si) (FIG. 5). The microlenses enable the transmission, in their totality, of the information elements generated by the photons, for there is no energy lost in the gaps between photosensitive elements in the present case.

An exemplary embodiment of a matrix of microlenses according to the method of the invention shall be described.

A sheet of Kapton with a thickness of 125 $\mu$m and an area $S = 100 \times 100$ mm$^2$ is chosen as an organic support.

This sheet is irradiated with a mechanical mask projection system, letting through a beam on 25 μm pads at a pitch of 40 μm. This irradiation is done with a pulse of an argon-fluorine laser emitting at 193 nm, this pulse generating a fluence of 100 mJ/cm². This surface treatment is done in a chamber with controlled humidity (water vapor very substantially promotes the appearance of so-called "hydrogen" type bonds).

On the locally irradiated sheet of Kapton, there is deposited the EPOTECNY mixture of the EPOTEK 302-3 type, comprising an epoxy resin and a hardening agent. A centrifugation operation, done at 5000 rpm for twenty seconds, makes it possible to obtain a 0.03 μm thickness. The sample is then left to rest for one hour under ambient conditions. At the end of this period, drops of mixture are formed on the irradiated zones. The unit formed by the Kapton sheet and the Epotek 302-3 mixture is left at ambient temperature for 12 hours (this slow hardening process does not lead to any shrinking of the structure) in order to rigidify the drops. The microlenses thus made have an index n=1.5430 and are transparent between 375 and 900 nm. It is possible to determine their focal length from their thickness e=2 pm. In the case of a thin lens (e<<d), we have:

$$f = \frac{d}{2(n-1)\sin A} \text{ with } tg\, A = \frac{2e}{d}$$

where A is the above-described angle. By calculation it is determined that A=4.5 and that the focal length f=0.3 mm.

What is claimed is:

1. A method for making microlenses wherein said microlenses are obtained by the deposition of the material on a substrate and wherein the method includes a step for the local surface modification by treatment of the substrate creating preferred zones of wettability for the material on the substrate.

2. A method for making microlenses according to claim 1, wherein the substrate is of an organic nature.

3. A method for making microlenses according to claim 2, wherein the surface of the substrate is locally modified by an intense UV radiation.

4. A method for making microlenses according to claim 3, wherein the intense UV radiation is produced by an excimer laser.

5. A method for making microlenses according to claim 1, wherein the microlenses are constituted by an organic material.

6. A method for making microlenses according to claim 2, wherein the organic material constituting the microlenses comprises a thermosetting resin or a resin hardenable by UV radiation.

7. A method for making microlenses according to claim 6, wherein the organic material constituting the microlenses is a mixture of epoxy resin and hardening agent or a mixture of silicone resin and hardening agent.

8. A method for making microlenses, wherein said microlenses are obtained by the deposition of a material on a substrate and wherein the method includes a step for the local surface modification by treatment of the substrate creating preferred zones of wettability for the material on the substrate, wherein the substrate is of an organic nature, and wherein the organic substrate is an aromatic polymer.

9. A method for making microlenses according to claim 8, wherein the aromatic polymer is of the polymide type or of the polyphenlquinoxaline type.

10. A method for making microlenses, wherein said microlenses are obtained by the deposition of a material on a substrate and wherein the method includes a step for the local surface modification by treatment of the substrate creating preferred zones of wettability for the material on the substrate, wherein the microlenses are constituted by an organic material, and wherein the organic material constituting the microlenses comprises a monomer that is polymerizable in lump.

11. A method for making microlenses according to claim 10, wherein the monomer polymerizable in lump is of the styrene type.

12. A method for making microlenses on a substrate comprising the steps of:
   selecting a substrate whose surface chemical composition and wettability is modifiable by exposure to radiation;
   irradiating selected portions of said substrate surface to modify the chemical composition and surface wettability of said selected portions of said substrate surface;
   depositing a fluid on said substrate surface which concentrates in drops on said irradiated selected portions; and
   treating said fluid drops to make said fluid drops into solids.

13. Method according to claim 12 wherein said substrate is a polymer.

14. Method according to claim 13 wherein said substrate is a kapton type polymer, said irradiated selected portions are approximately 25 μm pads at a pitch of approximately 40 μm; said irradiation is at a wavelength of approximately 193 nm with an energy of approximately 100 mJ/cm²; and said fluid being deposited comprises an epoxy resin and hardening agent.

15. Method according to claim 12 wherein said irradiation has a wavelength in the range of approximately 193 nm to 308 nm.

* * * * *